United States Patent [19]

Luciani et al.

[11] Patent Number: 4,858,835

[45] Date of Patent: Aug. 22, 1989

[54] EQUIPMENT FOR THE ACTUATION OF NEEDLES FOR THE REALIZATION OF ELECTRIC MOTORS FIELD WINDINGS

[75] Inventors: Sabatino Luciani, Florence; Antonio Lunini, Sesto Fiorentino, both of Italy

[73] Assignee: Axis S.p.A., Florence, Italy

[21] Appl. No.: 164,772

[22] Filed: Mar. 4, 1988

Related U.S. Application Data

[63] Continuation-in-part of Ser. No. 88,020, Aug. 18, 1987, Pat. No. 4,762,283, which is a continuation of Ser. No. 785,918, Oct. 10, 1985, abandoned.

[30] Foreign Application Priority Data

Nov. 26, 1987 [IT]   Italy ................ 68009 A/87

[51] Int. Cl.$^4$ .................................... H02K 15/085
[52] U.S. Cl. .................. 242/1.1 A; 242/1.1 R; 242/7.03
[58] Field of Search .......... 242/1.1 R, 1.1 A, 1.1 E, 242/7.14; 29/605, 596; 74/25, 568

[56] References Cited

U.S. PATENT DOCUMENTS

| | | | |
|---|---|---|---|
| 3,025,008 | 3/1962 | Nil et al. | 242/1.1 |
| 3,052,418 | 9/1962 | Gorski et al. | 242/1.1 R X |
| 3,214,996 | 11/1965 | Bono | 74/568 R |
| 3,785,282 | 1/1974 | Kamelander | 74/25 |
| 3,903,593 | 9/1975 | Mason | 29/596 |
| 4,257,253 | 3/1981 | Zanzerl | 74/568 R X |
| 4,361,056 | 11/1982 | George | 74/25 X |
| 4,612,702 | 9/1986 | Wheeler | 242/1.1 R X |
| 4,762,283 | 8/1988 | Sabatino | 242/1.1 R |

Primary Examiner—David Werner
Assistant Examiner—Phillip Han
Attorney, Agent, or Firm—Eric C. Woglom; Robert R. Jackson

[57] ABSTRACT

The machine for the actuation of needles for the realization of electric motors field windings is made of a case internally supporting a main shaft in revolving mode which is set in rotation by motor means; on the main shaft, means that perform an up and down oscillating motion at each complete rotation of the said shaft are provided in oscillating mode around an axis which is perpendicular to the axis of the shaft; at one end of such means a winding shaft is pivoted; into which are through cables that realize the winding on the slots of a stator, the winding shaft performs a reciprocating traverse motion driven by the said oscillating means; on the winding shaft a tube supporting the winding needles is concentrically inserted in oscillating mode, and it is set in reciprocating rotatory motion by kinematic motion means connected to the main shaft which accomplish an oscillation of the tube for each stroke end of the winding shaft; on the free ends of the tube and of the shaft concentric to it the winding needles are applied, which are equipped with reciprocating traverse and oscillating motion.

25 Claims, 6 Drawing Sheets

EQUIPMENT FOR THE ACTUATION OF NEEDLES FOR THE REALIZATION OF ELECTRIC MOTORS FIELD WINDINGS

This application is a continuation-in-part of U.S. patent application Ser. No. 88,020, filed Aug. 18, 1987, now U.S. patent 4,762,283, which was a continuation of U.S. patent application Ser. No. 785,918, filed Oct. 10, 1985, now abandoned.

The invention refers to an equipment for the actuation of needles for the realization of electric motors field windings.

The invention refers in particular to a variable stroke kinematic motion which drives the reciprocating traverse motion of a hollow shaft traversed by the winding cable holding a concentric tube which drives the needle holder heads; these wind up the cables of the stator slots.

Italian Patent applications N. 20184 A/85 of 2nd Apr. 1985 (corresponding to U.S. patent application Ser. No. 840,735, filed Mar. 18, 1986) and N. 21485 A/85 or 9th July 1985 (corresponding to U.S. patent 4,762,283) describe two different realizations of the cable carrier needles by means of which the field windings may be made without employing the traditional shoes.

The first application N. 20184 A/85 describes a winding needle animated by straight-line reciprocating motion combined with reciprocating rotatory motion around its own axis, where the needle is eccentric with respect to the centre of the stator and finds itself at such a distance, along the axis of symmetry of the cave to which it is adjacent, that the height of the point of the needle, calculated as a distance between its end and the axis, is equal or greater than the distance between the axis of the needle and the end of the front sealing tooth of the winding in the slots.

The second application N. 21485 A/85 describes a winding needle animated by straight-line reciprocating motion combined with reciprocating rotatory motion around its own axis where the end points of the needle are split and oscillating between a maximum approach position at a smaller distance among them than the maximum amplitude of the internal hollow of the stator and a maximum straddle position, where the ends of the points are at a higher distance than the one among the ends of the sealing teeth of the windings into the opposed slots of the stator.

In both cases the winding needles must perform complex traverse and reciprocating rotatory motions with the purpose of realizing a field winding making machine allowing the elimination of winding shapes or shoes and consequently of their turnbuckles and devices that clear them from the stator. These solutions offer a second advantage, that is to improve the winding which is formed around each slot, reducing the stroke of the needle and the loop performed by the wire externally to the stator, thanks to the elimination of the shoes, which is the main purpose of the invention.

Purpose of the invention is to propose a kinematic motion able to actuate alternatively both the above mentioned types of needles by substituting the needle holder heads relating to the end of the actuator kinematic motion.

For these and further purposes that will be better understood as the description follows the invention proposes to realize a machine for the actuation of the needles for the realization of the electric motors field windings characterized in that it is made of a case internally supporting a main shaft in revolving mode which is set in rotation by motor means; on the main shaft means that perform an up and down oscillating motion at each complete rotation of the said shaft are pivoted in oscillating mode, around an axis which is perpendicular to the axis of the shaft; at one end of such means a winding shaft is pivoted, into which are through cables that realize the winding on the slots of a stator, the winding shaft performs a reciprocating traverse motion driven by the said oscillating means; on the winding shaft a tube supporting the winding needles is concentrically inserted in oscillating mode and it is set in reciprocating rotatory motion by kinematic motion means connected to the main shaft which accomplish an oscillation of the tube for each stroke end of the winding shaft; means for the adjustment of the stroke of the winding shaft and of the amplitude of the tube oscillation concentric to it are foreseen; on the free ends of the tube and of the shaft concentric to them the winding needles are applied which are equipped with reciprocating traverse and oscillating motion.

A description of the machine follows and reference must be made to the enclosed drawings.

Figure 4:
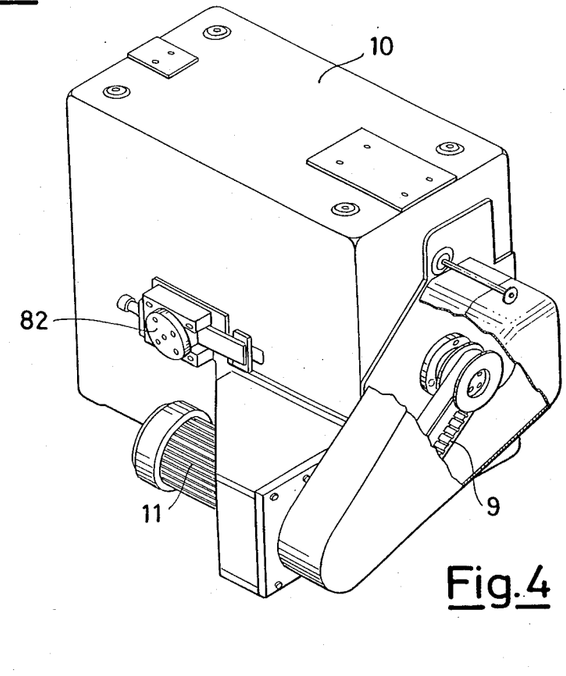
FIG. 4 is the perspective view of the box which contains the machine according to the invention.

According to the invention the machine is enclosed in a case 10 (FIGS. 1 and 4) on which an electric motor 11 is assembled, advantageously direct current operated and of the type without brushes, which, by a belt 9, acts directly on a main shaft 12. The latter is assembled on supports 13 and 14 of the case and its position during rotation is controlled by an encoder 15 placed on the end of the shaft 12 opposed to the one connected to motor 11 (see FIG. 1).

On the shaft 12 a disk 16 is assembled (FIGS. 1, 2, 3) which holds an internal portion 17 assembled in rotating mode into an external body 18 by means of bearings 19. The internal disk is assembled in oscillating mode on the shaft 12 by pins 20 transversely placed with respect to the axis of same shaft 12 so that the disk 16 may oscillate on the shaft 12 around x axis of pins 20.

Figure 1:
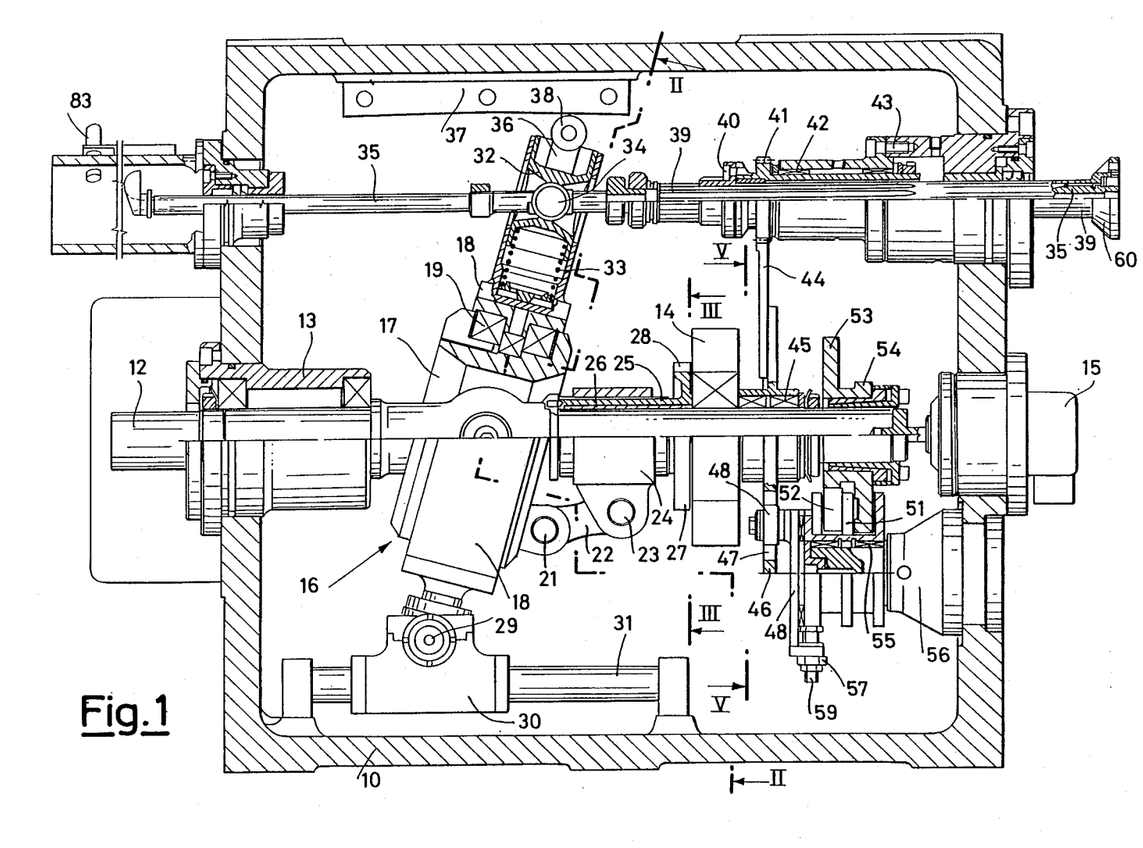
FIG. 1 is a sectional view of the machine according to the invention.
Figure 2:
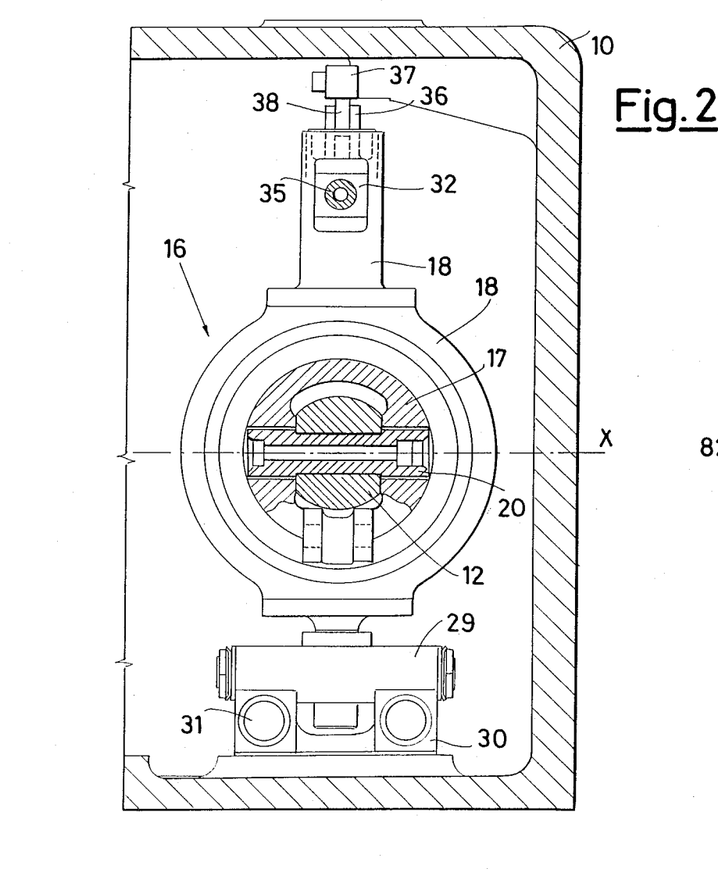
FIG. 2 and FIG. 3 are sectional views respectively according to outlines II–III of FIG. 1.
Figure 3:
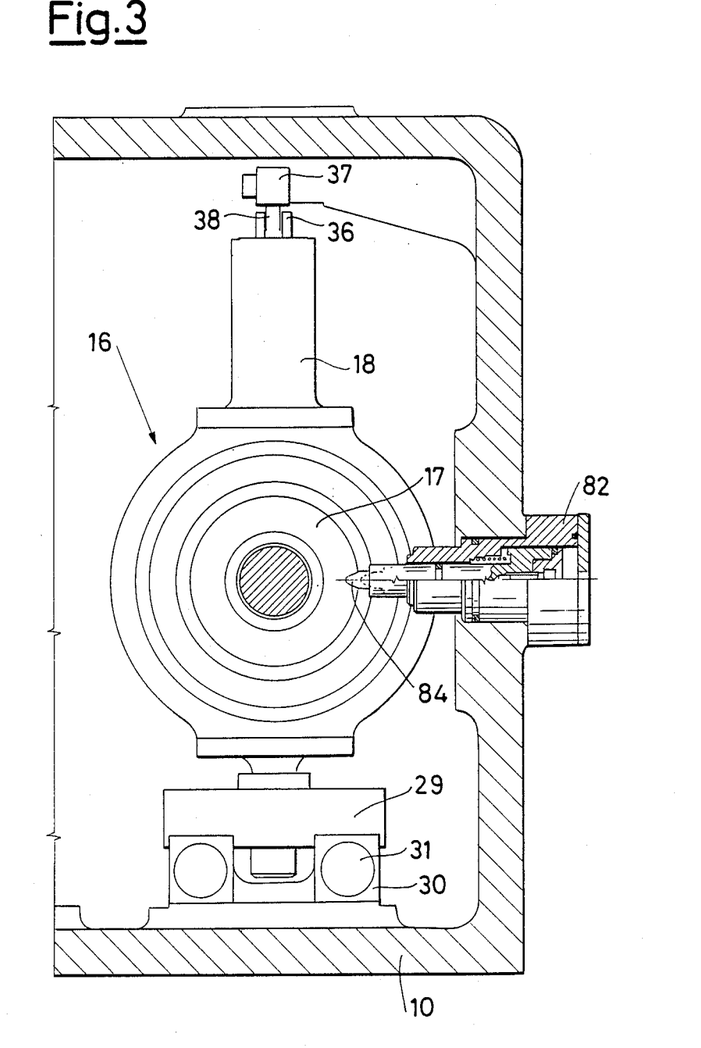

To the internal disk 17 is pivoted at 21 a connecting rod 22 which is also pivoted in 23 into a sleeve 24. The latter, internally threaded, is screwed on the external thread of a coupling sleeve 25, which is assembled on shaft 12 by bushings 26 and equipped with flange 27 in which a notch 28 is machined.

The external disk 18 in the lower part is pivoted in 29 on bushings 30 sliding along guides 31 which are integral with case 10.

In the upper part, the external disk 18 is box-type and it holds internally a cursor 32 which is thrusted towards the exterior by a spring 33. Cursor 32 is hinged to a circular portion 34 integral to the winding shaft 35, to which the reciprocating motion of the disk is transmitted, and it holds a roller 38, assembled on the end 36 of the cursor 32, sliding on a longitudinal race 37 which is integral to the case 10; in this way centrifugal stresses of the cursor 32 are avoided on the shaft 35 as the race 37 takes up the loads of the cursor 32.

The winding shaft 35 is hollow and the cables appointed for the realization of the field windings slide into it.

On the shaft 35 a second shaft 39 concentric to it is inserted, which is externally splined; a sleeve 40, internally splined is assembled on the shaft 39 and holds a pinion 41 integral to it, assembled by means of bearings 42 on an external support 43 secured to the case 10.

Figures 5, 6:
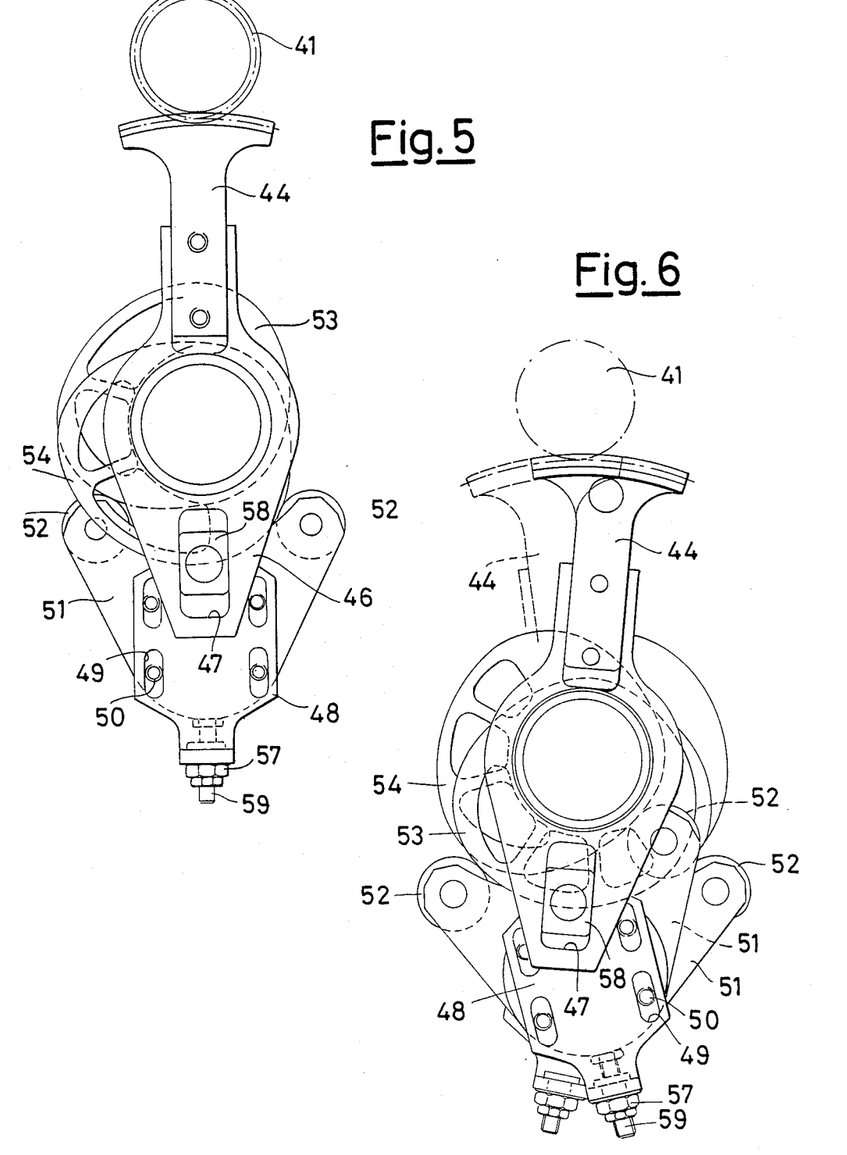
FIG. 5 and 6 are sectional views according to outline V—V of FIG. 1 in different operating conditions of the illustrated unit.

The pinion 41 is set in rotation by a sector gear 44 assembled neutrally on shaft 12, by means of bearing 45, and holding, on the other side with respect to shaft 12, a tailpiece 46 equipped with a slot 47 (FIGS. 1, 5 and 6). A cursor 58 slides in the slot 47, integral to a crank and slotted link 48 equipped with slots 49 in which pins 50 of a V-shaped plate 51 slide. To the ends of the plate 51 pins 52 are hinged and on each of them acts the surface of two coupled cams 53 and 54.

The V-shaped plate 51 is assembled on bearings 55 on a support 56, while the coupled cams 53 and 54 are keyed on the shaft 12.

Through cams 53 and 54, rotating with shaft 12 action can be made on pins 52 by making V-shaped element 51 oscillate and with it the crank and slotted link 48 and then the tailpiece 46 integral to the sector gear 44 which makes gear 41 rotate. By the latter, integral to the sleeve 40, the rotation on the shaft 39 is realized.

It is sufficient to loosen the nut 57 and to rotate the screw 59 moving upward or downward the position of the crank and slotted link 48 and then of its cursor 58 in the slot 47 in order to vary the amplitude of the oscillation of the shaft 39.

To the end of the rotating shaft 39 a flange 60 is applied which transmits the rotatory motion to the winding needles integral to the internal traversing shaft 35.

Figure 7:
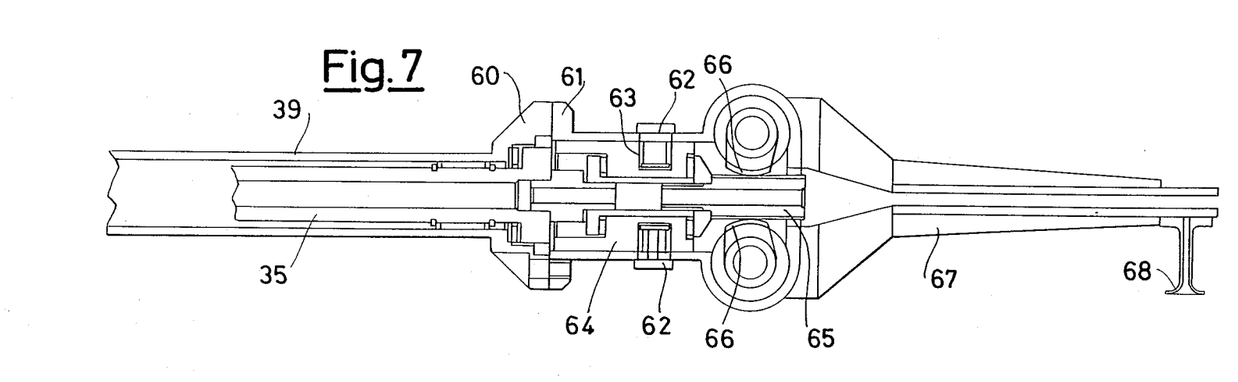
FIG. 7 is the axial view of the needle holder unit as the first realization of the invention.
Figure 7A:
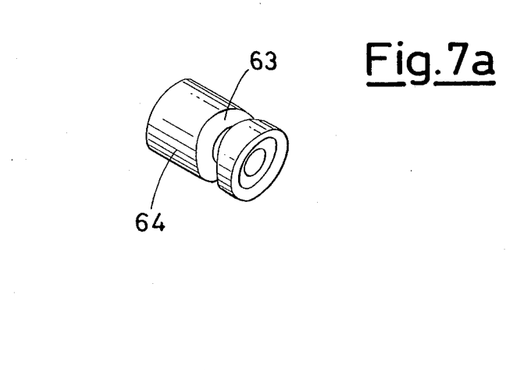
FIG. 7a is the perspective view of a part of FIG. 7.
Figure 8:
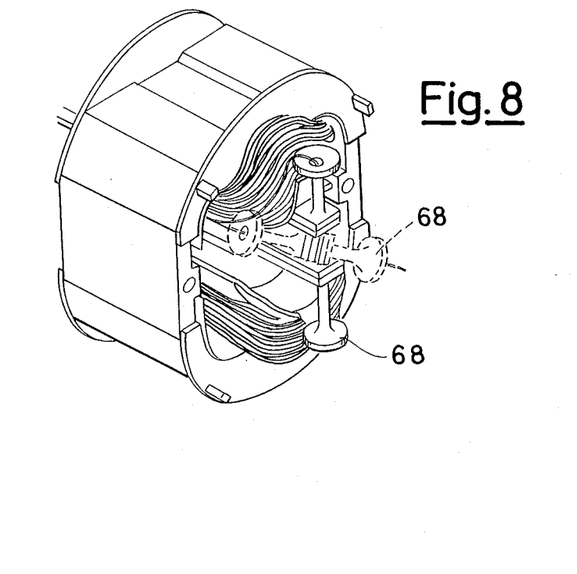
FIG. 8 is the perspective view of a stator in which the needle holder unit illustrated in FIG. 7 operates.

In the solution illustrated in FIGS. 7, 7a and 8 the needles describe an ellipse straddling and rotating to the front and back outlets of the stator as described and claimed in patent application N. 21485 A/85 of 9th July 1985 mentioned above.

In order to obtain this movement of the needles, to the flange 60 is applied, an integral jacket 61 which holds two opposed pins 62 integral neutrally assembled which are connected to a circular spline of an internal sleeve 64.

The sleeve 64 is sliding into the jacket 61 and its traverse is realized thanks to the fact that the sides 63 of its spline (FIG. 7a) have an arched shaped and are not lying on a perpendicular plane to the axis of the needles so that when the jacket 61 rotates, driven by the shaft 39 to which it is integral, the pins 62 translate in the two opposite ways, depending on the direction of rotation of the sleeve 64, as they slide on the cam track realized by its spline 63.

The front end of the sleeve 64 holds integral a rack in which sector gears 66 mesh to which are integral the needle holder 68 levers 67.

The sliding of the sleeve 64 and of its rack 65 then determines the rotation respectively in the opening and closing of the needles 68 (see FIG. 8).

The rotation of the sleeve 64 is in time with the reciprocating traverse motion of the winding shaft so the run of the needles 68 will result as ovoid-shaped out of the stator, having the advantage that, when calculating different shapes of cams 63 on the sleeve 64 it will be possible to find the optimum run of the cable in order to obtain better coils.

Figures 9, 10, 11:
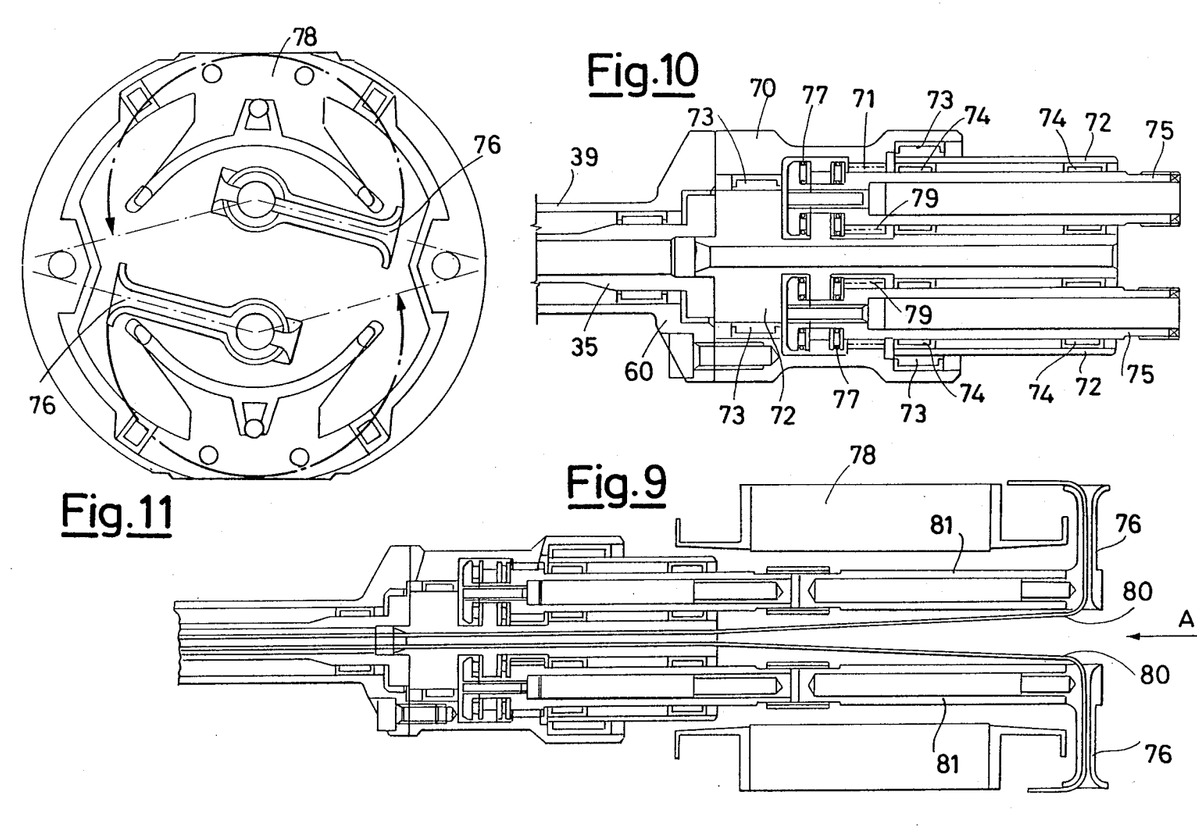
FIG. 9 is the axial section of the needle holder unit as the second realization of the invention.
FIG. 10 is the enlarged view of a part of the unit illustrated in FIG. 9.
FIG. 11 is the view according to arrow A of FIG. 9.

In the second solution illustrated in FIGS. 9, 10 and 11 the needles are eccentric with respect to the axis of the winding shaft 35 and thus of the stator and at the outlets of the same stator they execute some arcs of circle (FIG. 11) while they wind the cable as described and claimed in the patent application N. 20184 A/85 of 2nd Apr. 1985 mentioned above.

To the flange 60 an external jacket 70 is made integral which holds an internal toothing 71. Integral to traverse, winding shaft 35, a shaft 72 is assembled, on bearings 73 in the inside of the jacket 70, which may thus rotate on shaft 72.

Into the slots of shaft 72, and assembled on bearings 74, are two tubes 75 for the clutch of the needles 76. Front bearings 77 assembled among the internal ends of the tubes 75 and projections of the internal shaft 72 allow to discharge stretches and stresses that take place on needles 76 at the end of the respective winding strokes at the outlet of the stator 78.

The tubes 75 are then geared in 79 so as to engage in the toothings 71 of the external jacket and be driven to rotation by the latter.

The two needles 76 holding the respective winding cables 80 are assembled integral to clutch tubes 81 and are locked at the end of tubes 75 by threaded coupling sleeves 82 that are screwed on the same number of threads of tubes 81 and 75.

By utilizing the above described machine contained into the case 10 it is possible to effect an automatic adjustment of the stroke of the winding shaft 35 and a manual adjustment of the oscillation amplitude of the tube 39 and thus of the winding needles 68 or 76.

The automatic adjustment of the stroke of the winding shaft 35 may be programmed by the microprocessor which controls the motor 11.

The value of the stroke to be effected is then being controlled by the video of the machine, that is a seek control is given on a preset stroke relating to the length of the stator on which the winding must be made.

The microprocessor starts, controlling a pneumatic unit 82 (FIG. 3 and 4), to carry out the movement of a tooth 84 to engage in the notch 28 (FIG. 1) machined in the disc 27. This coupling avoids the rotation of the sleeve 25; the motor 11 starts to rotate at such a speed as it has been programmed by the software regarding adjustments. Its position is controlled by the encoder 15 placed on the main shaft 12 on the opposite side of the motor.

Therefore, when the motor brings to rotation the disk 17 the sleeve 24 will also rotate through the connecting rod 22. As the disk 25 is locked by the above mentioned clutch 28, the sleeve 24 will slide longitudinally thanks to the thread in its interior and on the disk 25 until it brings the disc 18 to the maximum backward inclination toward the motor. The winding shaft 35 will have thus run all the possible backward stroke until when it will enter into the operating field of the microprocessor 83, which will communicate to the encoder that from that moment on when the same encoder will find a reference notch the adjustment will find itself in 0 condition, and therefore the adjustment will have been reset.

From this moment on the motor 11 may reverse the rotation direction and return to a condition of a new run set by the video for a new stator to be wound, so that the encoder 15 will start the count of the notches until it will stop on the one which refers to the programmed stroke.

The notches of the encoder are connected to the stroke by a data table placed in the microprocessor and such data indicate by trigonometric calculations carried out previously the correlation between the notches of the encoder 15 and the stroke of the winding shaft 35, because as it can be noticed on the drawing the movement of the shaft 35 results amplified by the oscillating disk with respect to the movement of the sleeve 40.

The manual adjustment of the oscillation amplitude of the tube 39 takes place by acting on the screw 59 after loosening the nut 57 (FIG. 1, 5 and 6). In such way the crank and slotted link moves upward or downward depending on the direction of the rotation of the screw, thus changing the oscillation angle of the section 44 which brings to the oscillation variation of the shaft 39 by means of the sleeve 40.

We claim:

1. Machine for the actuation of needles for the realization of electric motor field windings characterized in that it is made of a case internally supporting a main shaft in revolving mode which is set in rotation by motor means; on the main shaft means that perform an up and down oscillating motion at each complete rotation of the said shaft are pivoted, in oscillating mode around an axis which is perpendicular to the axis of the shaft; at one end of such means a winding shaft is pivoted, into which are through cables that realize the winding on the slots of a stator, the winding shaft performs a reciprocating traverse motion driven by the said oscillating means; on the winding shaft a tube supporting the winding needles is concentrically inserted in oscillating mode and is set in reciprocating rotatory motion by kinematic motion means connected to the main shaft which accomplish an oscillation of the tube for each stroke end of the winding shaft; means for adjusting the stroke of the winding shaft and the oscillation amplitude of the tube concentric to it are also being foreseen; and means on the free ends of the tube and of the shaft concentric to them for mounting the winding needles so that said needles perform a reciprocating traverse and oscillating motion; wherein the oscillating means on the main shaft are made of a disk axially pivoted on the shaft and revolving into a frame; the disk being connected through a connecting rod to a sleeve which is assembled on the shaft in revolving mode with it; on one end of the frame a cursor is held, sliding into the frame thrusted by elastic means, and pivoted on the winding shaft around a perpendicular axis to the axis of the same winding shaft.

2. Machine according to claim 1 characterized in that the cursor holds an end wheel sliding along a plane parallel to the axis of the winding shaft.

3. Machine for the actuation of needles for the realization of electric motor field windings characterized in that it is made of a case internally supporting a main shaft in revolving mode which is set in rotation by motor means; on the main shaft means that perform an up and down oscillating motion at each complete rotation of the said shaft are pivoted, in oscillating mode around an axis which is perpendicular to the axis of the shaft; at one end of such means a winding shaft is pivoted, into which are through cables that realize the winding on the slots of a stator, the winding shaft performs a reciprocating traverse motion driven by the said oscillating means; on the winding shaft a tube supporting the winding needles is concentrically inserted in oscillating mode and is set in reciprocating rotatory motion by kinematic motion means connected to the main shaft which accomplish an oscillation of the tube for each stroke end of the winding shaft; means for adjusting the stroke of the winding shaft and the oscillation amplitude of the tube concentric to it are also being foreseen; and means on the free ends of the tube and of the shaft concentric to them for mounting the winding needles so that said needles perform a reciprocating traverse and oscillating motion; wherein the kinematic motion means are made of a gear integral to the tube in which a sector gear is engaged which is assembled on the main shaft in revolving mode and holds a tailpiece in which is connected the cursor of a V-shaped crank and slotted link on the ends of which slide the surfaces of a coupled cam integral to the main shaft which transmits the oscillating motion to the said crank and slotted link and from it to the sector gear and to the tube through the said gear; said gear being integral to a sleeve which performs a longitudinal slotted coupling on the tube.

4. Machine according to claim 3 characterized in that the amplitude of the tube oscillation is adjusted by varying, by means of a screw, the position of the hinging axis of the crank and slotted link.

5. Machine for the actuation of needles for the realization of electric motor field windings characterized in that it is made of a case internally supporting a main shaft in revolving mode which is set in rotation by motor means; on the main shaft means that perform an up and down oscillating motion at each complete rotation of the said shaft are pivoted, in oscillating mode around an axis which is perpendicular to the axis of the shaft; at one end of such means a winding shaft is pivoted, into which are through cables that realize the winding on the slots of a stator, the winding shaft performs a reciprocating traverse motion driven by the said oscillating means; on the winding shaft a tube supporting the winding needles is concentrically inserted in oscillating mode and is set in reciprocating rotatory motion by kinematic motion means connected to the main shaft which accomplish an oscillation of the tube for each stroke end of the winding shaft; means for adjusting the stroke of the winding shaft and the oscillation amplitude of the tube concentric to it are also being foreseen; and means on the free ends of the tube and of the shaft concentric to them for mounting the winding needles so that said needles perform a reciprocating traverse and oscillating motion; wherein the adjustment of the stroke of the winding shaft is effected by means of the positioning of the sleeve, to which the oscillating disk is constrained, on the main shaft; the sleeve being internally threaded so as to be screwed on the external thread of a coupling sleeve, directly assembled on the main shaft, provided with engagement seat of a locking tooth that can be operated when adjusting the position of the winding shaft controlled by a position sensor on point 0 of the stroke; an encoder determines the excursion of the stroke of the winding shaft intervening directly on the main shaft before the disengagement of such tooth from the seat of the coupling sleeve.

6. Machine for the actuation of needles for the realization of electric motor field windings characterized in that it is made of a case internally supporting a main shaft in revolving mode which is set in rotation by motor means; on the main shaft means that perform an up and down oscillating motion at each complete rotation of the said shaft are pivoted, in oscillating mode around an axis which is perpendicular to the axis of the shaft; at one end of such means a winding shaft is pivoted, into which are through cables that realize the winding on the slots of a stator, the winding shaft performs a reciprocating traverse motion driven by the said oscillating means; on the winding shaft a tube supporting the winding needles is concentrically inserted in oscillating mode and is set in reciprocating rotatory motion by kinematic motion means connected to the main shaft which accomplish an oscillation of the tube for each stroke end of the winding shaft; means for adjusting the stroke of the winding shaft and the oscillation amplitude of the tube concentric to it are also being foreseen; and means on the free ends of the tube and of the shaft concentric to them for mounting the winding needles so that said needles perform a reciprocating traverse and oscillating motion; wherein the winding needles are connected to the winding shaft and to the tube concentric to it by means for varying the transverse spacing between the winding needles during the rotation stages actuated by the tube, foreseen at the end of the traverse stages into the stator actuated by the winding shaft.

7. Machine according to claim 6 characterized in that the needles are integral to sector gears hinged to a jacket around axis parallel among them and perpendicular to the traverse axis; said sector gears being meshed in an end rack of a body, in the interior of a jacket, and sliding into it by the employment of eccentric surfaces of circumferential seats of pins of the jacket, which is integral when rotating with the tube concentric to the winding shaft.

8. Machine for the actuation of needles for the realization of electric motor field windings characterized in that it is made of a case internally supporting a main shaft in revolving mode which is set in rotation by motor means; on the main shaft means that perform an up and down oscillating motion at each complete rotation of the said shaft are pivoted, in oscillating mode around an axis which is perpendicular to the axis of the shaft; at one end of such means a winding shaft is pivoted, into which are through cables that realize the winding on the slots of a stator, the winding shaft performs a reciprocating traverse motion driven by the said oscillating means; on the winding shaft a tube supporting the winding needles is concentrically inserted in oscillating mode and is set in reciprocating rotatory motion by kinematic motion means connected to the main shaft which accomplish an oscillation of the tube for each stroke end of the winding shaft; means for adjusting the stroke of the winding shaft and the oscillation amplitude of the tube concentric to it are also being foreseen; and means on the free ends of the tube and of the shaft concentric to them for mounting the winding needles so that said needles perform a reciprocating traverse and oscillating motion; wherein the winding needles are assembled at the end of parallel tubes and placed with respect to the traverse axis of the winding shaft; such tubes being rotated by an external jacket which is in turn integral to the concentric tube of the winding shaft.

9. Machine according to claim 8 characterized in that the tubes are neutrally assembled onto an internal shaft, integral to the winding shaft, and are integral to the jacket by means of toothed couplings with it; the internal shaft is, in turn, assembled neutrally on the external jacket.

10. A machine for actuating the needles used to wind electric motor field coils comprising:
a housing;
a first member having a longitudinal axis and being mounted for longitudinal reciprocation relative to said housing parallel to said longitudinal axis;
a second member mounted for longitudinal reciprocation with said first member and for rotational oscillation relative to said first member about said longitudinal axis;
means for causing said first member to reciprocate longitudinally and said second member to oscillate rotationally; and
means mutually coupled to said first and second members for connecting first and second needles to said first and second members so that said first and second needles reciprocate longitudinally in response to said longitudinal recripocation of said first member, and so that said first and second needles move relative to one another in response to said rotational oscillation of said second member.

11. The machine defined in claim 10 further comprising:
means for preventing said first member from rotating relative to said housing about said longitudinal axis.

12. The machine defined in claim 10 wherein said first and second needles are laterally spaced from one another on respective opposite sides of a central axis which is substantially parallel to the length of said first and second needles, and wherein said means mutually coupled to said first and second members comprises:
means responsive to said rotational oscillation of said second member for causing said first and second needles to oscillate rotationally about said central axis, and for also causing each of said first and second needles to alternately pivot toward and away from said central axis.

13. The machine defined in claim 12 wherein said means mutually coupled to said first and second members further comprises:
first and second means for respectively pivotally connecting said first and second needles to said second member, the pivotal axes of said first and second means being substantially perpendicular to said longitudinal axis.

14. The machine defined in claim 13 wherein said means mutually coupled to said first and second members further comprises:
first and second cam and cam follower means respectively coupled between said first and second needles and said first member for causing said first and second needles to pivot about the pivotal axes of said first and second means as said second member causes said first and second needles to oscillate rotationally about said central axis.

15. The machine defined in claim 13 wherein said means mutually coupled to said first and second members further comprises:
cam and cam follower means coupled between said first and second members and including an output member for converting said rotational oscillation of said second member to longitudinal reciprocation of said output member relative to said second member substantially parallel to said longitudinal axis; and means for coupling said output member to said first and second needles so that said longitudinal reciprocation of said output member causes pivotal oscillation of said first and second needles about the pivotal axes of said first and second means, respectively.

16. The machine defined in claim 10 wherein said first member is substantially concentric with said longitudinal axis, and wherein said second member comprises a hollow tube concentrically mounted on said first member.

17. The machine defined in claim 10 wherein said first and second needles are laterally spaced from one another on respective opposite sides of a central axis which is substantially parallel to the length of said first and second needles, and wherein said means mutually coupled to said first and second members comprises:

means responsive to said rotational oscillation of said second member for causing each of said first and second needles to oscillate rotationally about first and second oscillation axes, respectively, said first and second oscillation axes being substantially parallel to said central axis and laterally spaced from one another on respective opposite sides of said central axis.

18. The machine defined in claim 17 wherein said first needle is substantially concentric with said first oscillation axis, and wherein said second needle is substantially concentric with said second oscillation axis.

19. The machine defined in claim 18 wherein said means mutually coupled to said first and second members further comprises:

driving gear means mounted on one of said first and second members;

means for mounting each of said first and second needles on the other of said first and second members for rotation about the associated oscillation axis; and driven gear means mounted on each of said first and second needles and meshing with said driving gear means so that relative rotation of said first and second members causes each of said first and second needles to rotate about the associated oscillation axis.

20. The machine defined in claim 10 further comprising:

means for adjusting the stroke of at least one of said longitudinal reciprocation and said rotational oscillation.

21. The machine defined in claim 20 wherein said means for adjusting the stroke comprises:

first means for adjusting the stroke of said longitudinal reciprocation; and second means for adjusting the stroke of said rotational oscillation.

22. The method of actuating the needles used to wind electric motor field coils comprising the steps of:

reciprocating first and second members parallel to a longitudinal axis;

causing said second member to rotationally oscillate relative to said first member about said longitudinal axis in synchronism with the reciprocation of said first and second members; and coupling said first and second members to first and second needles so that said first and second needles reciprocate in response to said reciprocation of said first and second members, and so that said first and second needles move relative to one another in response to the rotational oscillation of said second member.

23. The method defined in claim 22 wherein said first and second needles are laterally spaced from one another on respective opposite sides of a central axis which is substantially parallel to the length of said first and second needles, and wherein said step of coupling said first and second members to first and second needles comprises the step of:

responding to said rotational oscillation of said second member by rotationally oscillating said first and second needles about said central axis, and by pivoting each of said first and second needles alternately toward and away from said central axis.

24. The method defined in claim 22 wherein said first and second needles are laterally spaced from one another on respective opposite sides of a central axis which is substantially parallel to the length of said first and second needles, and wherein said step of coupling said first and second members to first and second needles comprises the step of:

responding to said rotational oscillation of said second member by rotationally oscillating each of said first and second needles about first and second oscillation axes, respectively, said first and second oscillation axes being substantially parallel to said central axis and laterally spaced from one another on respective opposite sides of said central axis.

25. The method defined in claim 22 wherein said electric motor field coils may be of different dimensions, and wherein said method further comprises the step of:

adjusting the stroke of at least one of said longitudinal reciprocation and said rotational oscillation in accordance with the dimensions of the field coils to be wound.

* * * * *